(12) United States Patent
Kupferberg

(10) Patent No.: US 10,422,126 B2
(45) Date of Patent: Sep. 24, 2019

(54) COMPRESSION SEAL GROOVE CONNECTOR

(71) Applicant: Robert Jeffrey Kupferberg, Hampstead (CA)

(72) Inventor: Robert Jeffrey Kupferberg, Hampstead (CA)

( * ) Notice: Subject to any disclaimer, the term of this patent is extended or adjusted under 35 U.S.C. 154(b) by 5 days.

(21) Appl. No.: 15/584,282

(22) Filed: May 2, 2017

(65) Prior Publication Data

US 2018/0031154 A1 Feb. 1, 2018

Related U.S. Application Data

(60) Provisional application No. 62/366,709, filed on Jul. 26, 2016.

(51) Int. Cl.

| E04B 2/78 | (2006.01) |
|---|---|
| E04B 1/68 | (2006.01) |
| E04B 1/61 | (2006.01) |
| E04B 1/58 | (2006.01) |
| F16B 5/06 | (2006.01) |
| F16B 5/00 | (2006.01) |
| F25D 23/06 | (2006.01) |
| E04B 1/66 | (2006.01) |
| F16B 11/00 | (2006.01) |
| F24F 13/20 | (2006.01) |
| F24F 1/56 | (2011.01) |

(52) U.S. Cl.
CPC ............ *E04B 1/5812* (2013.01); *E04B 1/66* (2013.01); *E04B 1/6812* (2013.01); *E04B 2/7863* (2013.01); *E04B 2/7872* (2013.01); *F16B 5/0028* (2013.01); *F16B 5/0685* (2013.01); *F16B 11/006* (2013.01); *F24F 1/56* (2013.01); *F24F 13/20* (2013.01); *F25D 23/063* (2013.01)

(58) Field of Classification Search
USPC ......... 52/282.1–282.3, 282.5, 285, 780, 781, 52/800.12, 717.05, 846, 79.12, 270, 52/287.1, 482, 775, 7, 64
See application file for complete search history.

(56) References Cited

U.S. PATENT DOCUMENTS

| 2,079,635 A | * | 5/1937 | Sharp | B63B 3/68 114/71 |
| 2,744,042 A | * | 5/1956 | Pace | B29C 44/186 105/360 |
| 2,934,180 A | * | 4/1960 | Hammitt | E04B 2/7854 428/83 |
| 2,976,969 A | * | 3/1961 | Gillespie | E04B 2/967 52/204.591 |

(Continued)

FOREIGN PATENT DOCUMENTS

| BE | 894413 A | * | 3/1983 |
| CH | 517924 A | * | 2/1971 |

(Continued)

*Primary Examiner* — Robert Canfield
(74) *Attorney, Agent, or Firm* — Welsh, Flaxman & Gitler LLC

(57) ABSTRACT

A plenum housing includes a plurality of construction panels and a plurality of compression seal groove connectors secured between the plurality of construction panels. Each of the plurality of compression seal groove connectors includes a recess having at least one interior surface with at least one compression seal groove.

8 Claims, 7 Drawing Sheets

(56) References Cited

U.S. PATENT DOCUMENTS

| | | | | |
|---|---|---|---|---|
| 3,023,859 A * | 3/1962 | Muessel | ............... | E04B 2/967 138/106 |
| 3,028,938 A * | 4/1962 | Schorr | ............... | E04D 3/08 52/204.597 |
| 3,039,232 A * | 6/1962 | Dunn | ............... | E04D 3/36 52/204.591 |
| 3,082,848 A * | 3/1963 | Keller | ............... | E04B 2/7863 52/235 |
| 3,095,853 A * | 7/1963 | Stont | ............... | A01K 63/003 119/266 |
| 3,216,538 A * | 11/1965 | Miller | ............... | E04F 10/08 29/432 |
| 3,266,656 A * | 8/1966 | Kridle | ............... | B65D 9/12 220/4.28 |
| 3,349,533 A * | 10/1967 | Gregoire | ............... | E04B 2/7854 52/282.2 |
| 3,387,418 A * | 6/1968 | Tyrer | ............... | E04B 2/825 52/242 |
| 3,394,526 A * | 7/1968 | Engelbrecht | ............... | E04B 1/6112 52/18 |
| 3,692,349 A * | 9/1972 | Ehrlich | ............... | B62D 33/04 296/186.1 |
| 3,716,259 A * | 2/1973 | Weill | ............... | B65D 9/34 220/683 |
| 3,738,083 A * | 6/1973 | Shimano | ............... | E04B 1/24 52/271 |
| 3,753,843 A * | 8/1973 | Hutchison | ............... | B29C 44/1266 428/116 |
| 3,866,373 A * | 2/1975 | Hudock | ............... | E06B 3/22 52/309.1 |
| 3,989,157 A * | 11/1976 | Veenema | ............... | B65D 9/34 220/4.28 |
| 3,989,397 A * | 11/1976 | Baker | ............... | F16B 12/02 403/205 |
| 4,019,302 A * | 4/1977 | Meyer | ............... | E04B 1/6116 52/843 |
| D245,106 S * | 7/1977 | Scheid | ............... | D25/125 |
| 4,382,106 A * | 5/1983 | Royster | ............... | B32B 3/12 428/40.1 |
| D283,446 S * | 4/1986 | Burkinshaw | ............... | D25/125 |
| 4,606,959 A * | 8/1986 | Hillinger | ............... | B32B 3/12 428/116 |
| 4,749,601 A * | 6/1988 | Hillinger | ............... | B32B 3/12 428/116 |
| 4,828,132 A * | 5/1989 | Francis, Jr. | ............... | B65D 11/1853 16/225 |
| 4,902,365 A * | 2/1990 | Westlake, Sr. | ............... | B29D 24/005 156/273.9 |
| 5,404,684 A * | 4/1995 | Schwendeman | ............... | A47B 47/0041 52/282.2 |
| 5,470,139 A * | 11/1995 | Hsiao | ............... | A47B 47/005 312/111 |
| 5,647,181 A * | 7/1997 | Hunts | ............... | A63H 33/10 312/111 |
| 5,797,514 A * | 8/1998 | Twiggar | ............... | F25C 5/182 220/683 |
| 5,848,508 A * | 12/1998 | Albrecht | ............... | B32B 3/08 52/309.9 |
| 5,983,583 A | 11/1999 | Mattix et al. | | |
| 6,095,715 A * | 8/2000 | Hulls | ............... | B62D 33/046 403/231 |
| 6,138,435 A * | 10/2000 | Kocher | ............... | B32B 3/12 52/800.1 |
| 6,751,910 B2 | 6/2004 | Richardson | | |
| 7,047,576 B2 * | 5/2006 | Tavivian | ............... | A47K 3/30 16/225 |
| 7,188,456 B2 | 3/2007 | Knauseder | | |
| 7,591,053 B2 * | 9/2009 | Bosisio | ............... | E04H 13/006 211/85.16 |
| 9,010,053 B1 * | 4/2015 | Kupferberg | ............... | E04C 2/384 52/309.4 |
| 9,312,411 B2 * | 4/2016 | Laurin | ............... | E04B 1/61 |
| 2004/0118061 A1 * | 6/2004 | Little | ............... | E04B 2/7854 52/270 |
| 2006/0080920 A1 * | 4/2006 | Barr | ............... | F25D 13/00 52/270 |
| 2006/0096224 A1 * | 5/2006 | Asbury | ............... | F16B 5/02 52/582.1 |
| 2007/0227089 A1 * | 10/2007 | Lewis | ............... | B64D 11/00 52/468 |
| 2009/0014044 A1 * | 1/2009 | Hartman | ............... | E04B 1/3445 135/143 |

FOREIGN PATENT DOCUMENTS

| | | | | |
|---|---|---|---|---|
| CH | 581786 A5 * | 11/1976 | ............ | F16B 5/0028 |
| DE | 4208308 A1 * | 9/1993 | | |
| EP | 2657544 A2 * | 10/2013 | | |
| FR | 2587742 A1 * | 3/1987 | ............ | A47K 3/30 |
| FR | 2866920 A1 * | 9/2005 | ............ | E06B 3/5427 |
| GB | 1303779 A * | 1/1973 | ............ | A45C 5/00 |
| GB | 2058871 A * | 4/1981 | ............ | E04B 1/6112 |
| JP | 57187066 A * | 11/1982 | | |
| JP | 10-18454 * | 1/1998 | | |

\* cited by examiner

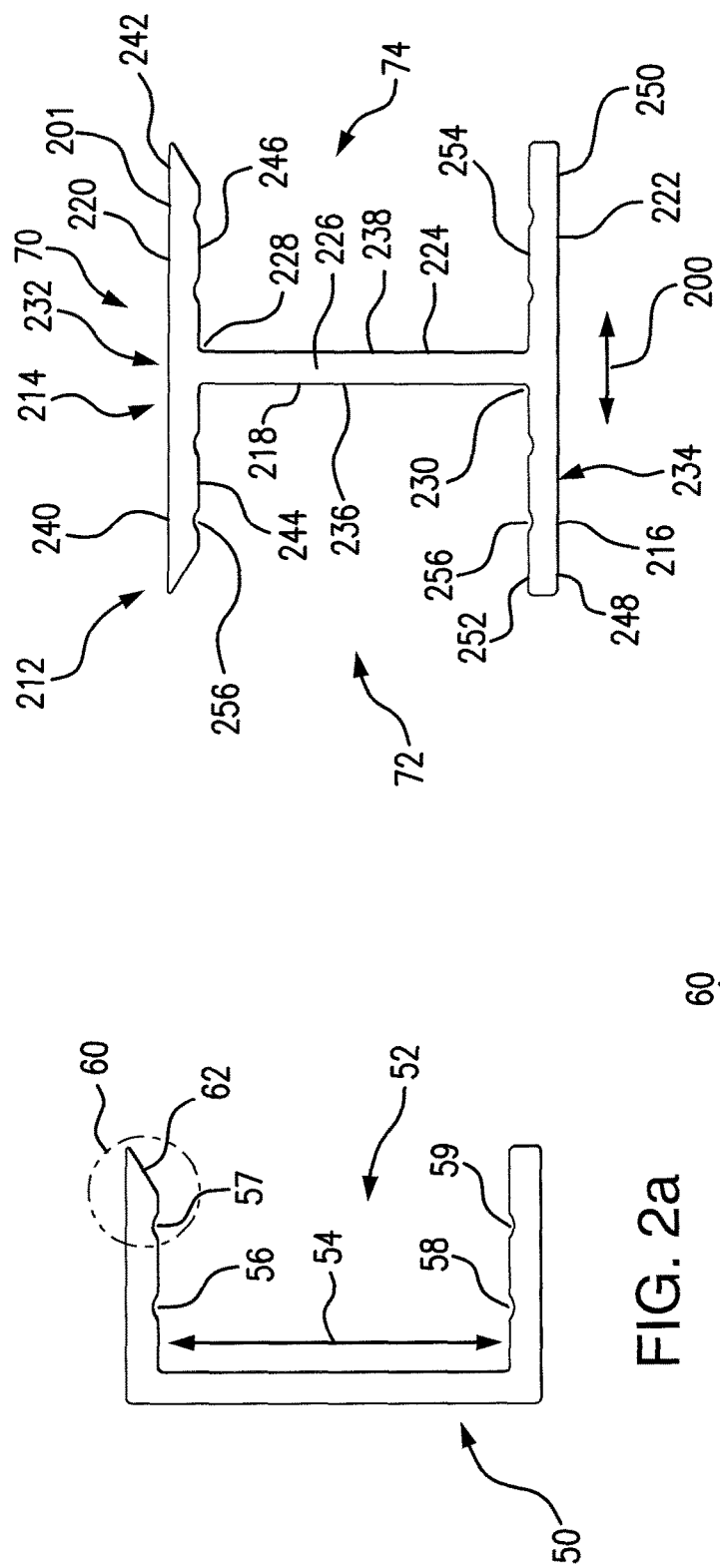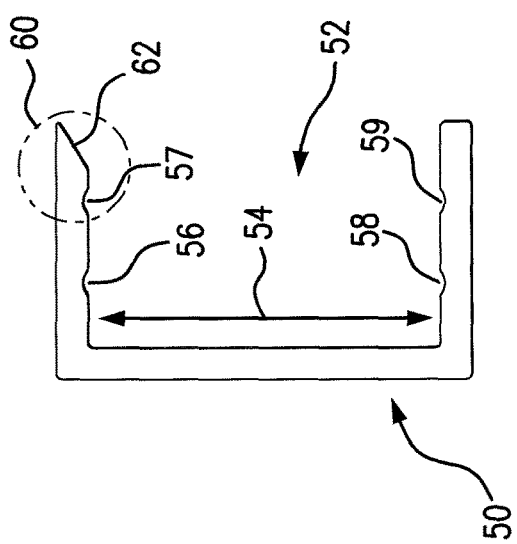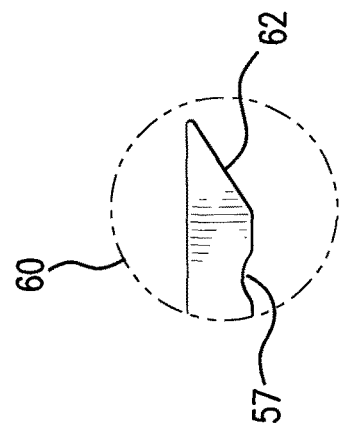

COMPRESSION SEAL GROOVE CONNECTOR

CROSS REFERENCE TO RELATED APPLICATION

This application claims the benefit of U.S. Provisional Patent Application Ser. No. 62/366,709, entitled "COMPRESSION SEAL GROOVE CONNECTOR," filed Jul. 26, 2016.

BACKGROUND OF THE INVENTION

1. Field of the Invention

The invention generally pertains to commercial and industrial equipment for the Heating, Ventilation, and Air Conditioning (H.V.A.C.) industry. In particular, the invention relates to an H.V.A.C. housing (also called an H.V.A.C. cabinet or unit) constructed from structural panels secured together using compression seal groove connectors enhancing breakage prevention characteristics.

2. Description of Related Art

Heat exchangers, compressors, blowers, filters and other H.V.A.C. equipment are often housed within an air handling enclosure. The enclosure helps shelter the equipment, provides a sound barrier, and perhaps most importantly, the enclosure provides a conduit for directing the air through the equipment. Air handling enclosures usually comprise a number of sheet metal panels that are interconnected to create a box-like structure.

In most cases, the panels are insulated to minimize heat loss between the interior and exterior of the enclosure. The primary functions of the insulation are to provide a reduction in sound transmission from the enclosed machinery into the surrounding space and to improve operating efficiency by minimizing undesirable heat loss or gain into the surrounding space. Insulation is rated according to its thermal resistance, or R-value, with a higher value being more desirable. In the past, fiberglass batt insulation has been used, and currently many major manufacturers have converted from using fiberglass batt to using some type of expanded foam insulation. Fiberglass batt can have an R-value varying from approximately 3.0 to 4.0 per inch thickness, and expanded foam insulation can have an R-value of anywhere between 4.0 and 7.5 or above, per inch thickness.

It is also appreciated that H.V.A.C. air distribution equipment operates with a static pressure differential across the housing walls. This pressure differential causes a deflection in the panels resulting in a slight bowing of the panels. This bowing puts high stress on the bond between the foam insulation and the metal of the panel, often leading to delamination and structural weakness.

As such, it is a desire of the present invention to provide components enhancing the construction and performance of H.V.A.C. housings.

SUMMARY OF THE INVENTION

The invention relates to a compression seal groove used on the interior of a compression seal connector to increase the seal between a panel used often in the construction of plenum housing units and a profile at higher static pressures or similar applications.

On their interior surfaces, compression seal groove connectors have compression seal grooves in order to be able to install panels into the compression seal groove connector to create a formation. In order to achieve a formation that is as stable as possible, the compression seal groove connector can have panels glued thereto.

It is an objective of the invention is to be able to manufacture and produce compression seal groove connectors for panels as easily and economically as possible.

Furthermore, it is an objective of the invention to produce a compression seal groove connector that enables an increased seal to be formed between the panel and the compression seal groove connector.

Another objective is to prepare a stable, durable plenum housing from the interconnected panels using the compression seal groove connectors with compression seal grooves, so that the resulting plenum housing unit has a lower leakage rate at higher static pressures.

As set forth in the invention, a compression seal groove connector is provided with at least one compression seal groove on an interior side that seats a panel for construction of plenum housing, or the like. The at least one compression seal groove facilitates greater sealant seating and compression between the panel and the compression seal groove connector when constructing the plenum housing or a similar type device.

It is only necessary to form the compression seal groove on the interior surface side of the compression seal groove connector to enable sealant to seat therein for a tight seal between the panel and the inner surface of the compression seal groove connector.

It is, therefore, an object of the present invention to provide a plenum housing including a plurality of construction panels and a plurality of compression seal groove connectors secured between the plurality of construction panels. Each of the plurality of compression seal groove connectors includes a recess having at least one interior surface with at least one compression seal groove.

It is also an object of the present invention to provide a plenum housing wherein the plurality of construction panels are thermal barrier double-wall construction panels.

It is another object of the present invention to provide a plenum housing wherein the at least one compression seal groove includes a plurality of compression seal grooves.

It is a further object of the present invention to provide a plenum housing wherein the plurality of compression seal grooves has a width of 5 mm and a depth of 1 mm.

It is also an object of the present invention to provide a plenum housing wherein the plurality of compression seal grooves are spaced at 18 mm intervals.

It is another object of the present invention to provide a plenum housing wherein the at least one compression seal groove extends along a length of the planar compression seal groove connector and is parallel to a longitudinal axis of the planar compression seal groove connector.

It is a further object of the present invention to provide a plenum housing wherein the plurality of compression seal groove connectors connect edges of the plurality of construction panels, the plurality of compression seal groove connectors being shaped and dimensioned to hold the plurality of construction panels in spaced relationships and at various angular orientations.

It is also an object of the present invention to provide a plenum housing wherein the plurality of construction panels includes first and second lateral side walls, a bottom wall, a top wall, a front wall and a rear wall.

It is another object of the present invention to provide a plenum housing wherein each of the plurality of construction panels has a foam core and interior and exterior engineered structural coverings.

It is a further object of the present invention to provide a plenum housing wherein each of the plurality of compression seal groove connectors is of an extruded polymer construction.

It is also an object of the present invention to provide a plenum housing wherein each of the plurality of compression seal groove connectors includes at least one recess shaped and dimensioned for encapsulating and engaging lateral edges of the plurality of construction panels.

It is another object of the present invention to provide a plenum housing wherein the plurality of compression seal groove connectors includes a perpendicular compression seal groove connector for securely holding adjacent construction panels in a perpendicular orientation.

It is a further object of the present invention to provide a plenum housing wherein the plurality of compression seal groove connectors includes a planar compression seal groove connector for securely holding adjacent construction panels in a planar orientation.

It is also an object of the present invention to provide a plenum housing wherein the plurality of compression seal groove connectors includes a single recess compression seal groove connector for attachment along exposed edges of adjacent construction panels.

It is another object of the present invention to provide a plenum housing wherein the plurality of compression seal groove connectors includes a perpendicular compression seal groove connector for securely holding adjacent construction panels in a perpendicular orientation, a planar compression seal groove connector for securely holding adjacent construction panels in a planar orientation, and a single recess compression seal groove connector for attachment along exposed edges of adjacent construction panels.

It is a further object of the present invention to provide a plenum housing including sealant or adhesive along the at least one interior surface of the compression seal connector, and filling the at least one compression seal groove.

Other objects and advantages of the present invention will become apparent from the following detailed description when viewed in conjunction with the accompanying drawings, which set forth certain embodiments of the invention.

BRIEF DESCRIPTION OF THE DRAWINGS

The invention is detailed below using the drawings which show for example schematic embodiments of the invention.

FIG. 2a is a side view of an alternate embodiment of a compression seal groove connector embodying the invention.

FIG. 2b is a blowup of a section of the compression seal groove connector of FIG. 2a.

FIG. 3 is a side view of an alternate embodiment of the invention.

DETAILED DESCRIPTION OF THE INVENTION

Figure 1:
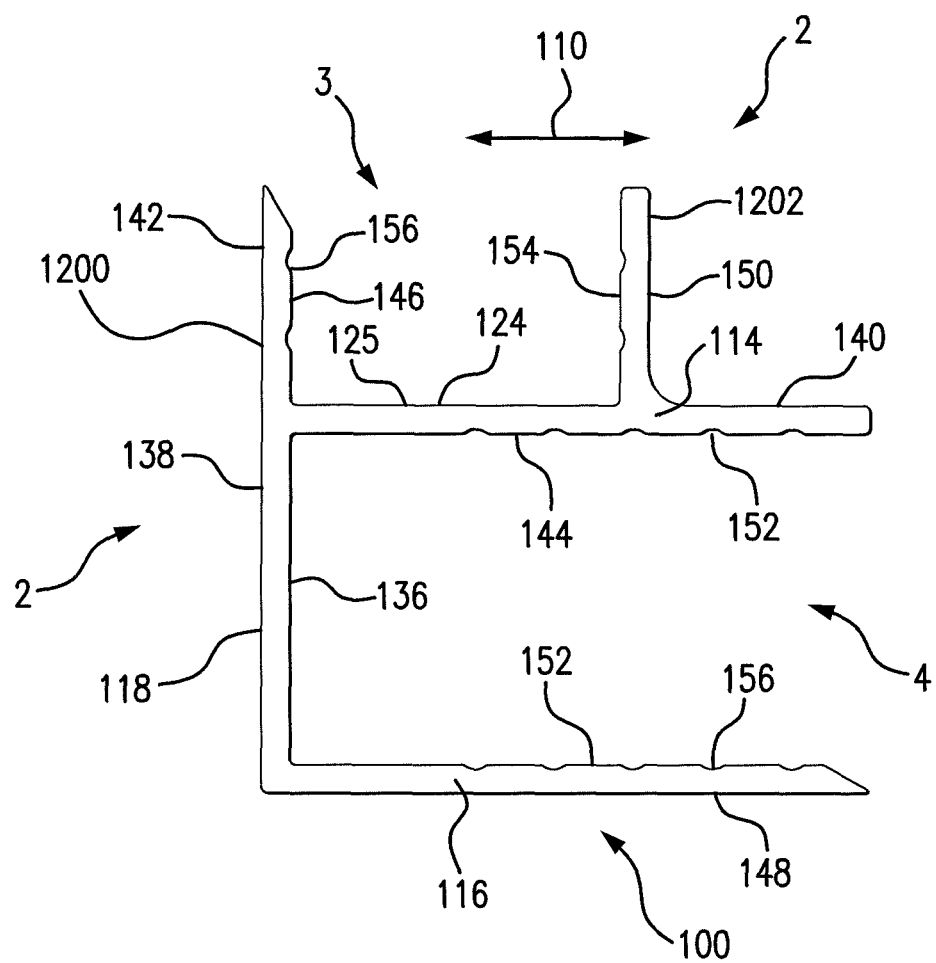
FIG. 1 is a side view of a corner compression seal groove connector embodying the invention.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Referring to FIGS. 1 to 12, the invention is directed to an H.V.A.C. plenum housing 200 made from a plurality of thermal-barrier double-wall construction panels, or the like, coupled together using compression seal groove connectors 2, 70, 350. As will be described below in greater detail, each of the thermal barrier double-wall construction panels 120 used in the construction of the H.V.A.C. housing 200 is built with an inner liner and an outer liner, two thermal barrier layer(s) composed of engineered structural coverings, and a foam insulation core. The H.V.A.C. housing 200 fabricated using the thermal barrier double-wall construction panels 120 held together by the compression seal groove connectors 2, 70, 350, offers additional benefits including low leakage, high strength and rigidity, sound damping characteristics, and corrosion resistant characteristics. In fact, the improved H.V.A.C. housing 200 obtained leakage rates much lower than the industry currently can obtain. The SHEET METAL AND AIR CONDITIONING CONTRACTORS' NATIONAL ASSOCIATION "SMACNA" provides standards which cover leakage criteria and standards based on proven methods for testing ductwork and air handling units for air leaks measured in duct leakage class units. Typical commercial units have a SMACNA duct leakage class in the range of "12", custom air handling units have a SMACNA duct leakage class of about "6" and the present invention can obtain a SMACNA duct leakage class of "3" or better. The housing of the present invention obtained a SMACNA duct leakage class under 3 and as low as 0.

It is appreciated that an H.V.A.C. housing 200 includes, among other embodiments, air conditioning units, exhaust units, plenums, heating equipment, cooling equipment, ventilation equipment, and air-to-air or air-to-water energy recovery equipment. In summary, any H.V.A.C. equipment can have a housing made up of thermal barrier double-wall construction panels 120. The housing 200 referred to in the present invention is an H.V.A.C. unit housing and it is appreciated the H.V.A.C. housing 200 may take various sizes and shapes for use in various applications. For the purposes of description, and with reference to FIGS. 4-8, the H.V.A.C. housing 200 is composed of a plurality of wall panels constructed in a rectangular shape with an inlet aperture 140, access aperture(s) 160 (with door(s) 170), and outlet aperture 180. The edges 120a of the various thermal barrier double-wall construction panels 120 are connected using the compression seal groove connectors 2, 70, 350 that are shaped and dimensioned for holding the thermal barrier double-wall construction panels 120 in a spaced relationship and at various angular orientations. A single chamber plenum H.V.A.C. housing 200 is disclosed with reference to FIG. 4. The H.V.A.C. housing 200 has an inlet aperture 140 and an outlet aperture 180 through which the air is directed as it moves from the source of air (under the control of fans (not shown) mounted within the outlet apertures 180). The H.V.A.C. housing 200 also includes access aperture(s) 160, which are selectively covered by access doors 170, allowing for access to the H.V.A.C. housing 200. The H.V.A.C. housing 200 is defined basically by first and second lateral side walls 210, 220, a bottom wall 240, a top wall 260, a front wall 280 and a rear wall 300. In accordance with a preferred embodiment, the front wall 280 is provided with the inlet aperture 140 and the rear wall is provided with the access aperture(s) 160 covered by the access door(s) 170 shaped and dimensioned to cover the access aperture(s) 160 as is known in the art. In addition, the first lateral side wall 210 is provided with the outlet apertures 180. It is appreciated the inlet and outlet apertures 140, 180, as well as the access aperture(s) 160, may be varied to suit specific needs, in particular, the size, location and shape of these apertures may be varied to suit specific needs.

Figure 9:
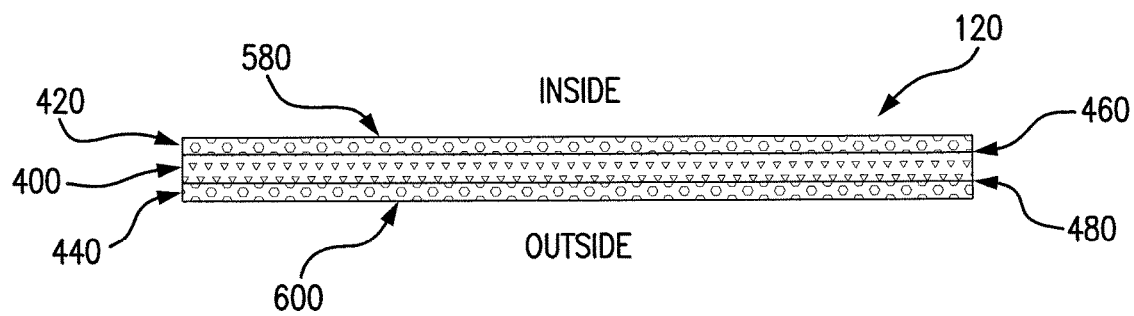
FIG. 9 is a schematic of a thermal barrier double wall construction panel in accordance with the present invention.

Each of the first and second lateral side walls 210, 220, the bottom wall 240, the top wall 260, the front wall 280 and the rear wall 300 is constructed from non-corrosive thermal barrier double-wall construction panels 120 as described below in greater detail. In accordance with a preferred embodiment, the thermal barrier double-wall construction panels 120 have a foam core 400, for example made of a polyurethane foam material, and interior and exterior engineered structural coverings 420, 440, for example, NIDA-CORE®. As is appreciated, exceptional strength and rigidity are provided, in a non-corrosive structure, by the foam and honeycomb panels. These thermal barrier double-wall construction panels 120 rely upon a honeycomb central sheet stock, as depicted in FIG. 9, composed of a co-polymer compound of polypropylene that is formed into honeycomb sheet stock, resulting in a structure with exceptional specific rigidity (stiffness to weight) and energy absorption, while incorporating the material benefits of visco-elasticity.

As the various figures show, each of the various walls 210, 220, 240, 260, 280, 300 may be composed of multiple structural thermal barrier double-wall construction panels 120 and these thermal barrier double-wall construction panels 120 are held together, in various desired orientations. The structural thermal barrier double-wall construction panels 120, and ultimately, the walls 210, 220, 240, 260, 280 are held together along their adjacent edges using elongated resilient extruded compression seal groove connectors 2, 70, 350.

The various compression seal groove connectors 2, 70, 350 used in accordance with the present invention are illustrated in FIGS. 1-3. Each of the compression seal groove connectors 2, 70, 350 includes at least one recess 3, 4, 72, 74, 350 shaped and dimensioned for encapsulating and engaging the lateral edge of structural thermal barrier double-wall construction panels 120. In accordance with a preferred embodiment, the compression seal groove connectors 2, 70, 350 are provided in three types. In particular, a perpendicular compression seal groove connector 2 is provided for securely holding adjacent structural thermal barrier double-wall construction panels 120 in a perpendicular orientation, that is, with the adjacent structural thermal barrier double-wall construction panels 120 held such that the planes in which they lie are perpendicular. A planar compression seal groove connector 70 is provided for securely holding adjacent structural thermal barrier double-wall construction panels 120 in planar orientation, that is, with the adjacent structural thermal barrier double-wall construction panels 120 held such that the planes in which they lie are the same. A single recess compression seal groove connector 350 is provided for attachment along exposed edges of adjacent structural thermal barrier double-wall construction panels 120. As with the structural thermal barrier double-wall construction panels 120, the compression seal groove connectors 2, 70, 350 are formed from non-corrosive materials. Preferably, the compression seal groove connectors 2, 70, 350 are formed by extrusion of polymers.

In particular, the planar compression seal groove connector 70 includes an elongated planar connector body 201 having diametrically opposed recesses 72, 74 that are shaped and dimensioned for receipt of and engagement with edges of the structural thermal barrier double-wall construction panels 120. The planar connector body 201 includes a longitudinal axis along which the length of the planar connector body 201 is defined (see FIG. 3). It is appreciated the length of the planar compression seal groove connector 70 may be varied depending upon the length of the panel edges that are being coupled. The planar connector body 201 also includes a lateral axis 210 defining the width of the planar connector body 201 (see FIG. 3).

Considering the planar connector body 201 when viewed along a cross sectional plane perpendicular to the longitudinal axis of the planar connector body 201, the planar connector body 201 includes a first end 212 having a first recess 72. The first recess 72 is defined by first and second lateral walls 214, 216 and an end wall 218 extending between the first and second lateral walls 214, 216 at the base of the first recess 72. The first and second lateral walls 214, 216 are parallel to each other, while the end wall 218 is perpendicular to the first and second lateral walls 214, 216. Similarly, the second recess 74 is defined by first and second lateral walls 220, 222 and an end wall 224 extending between the first and second lateral walls 220, 222 at the base of the second recess 74. The first and second lateral walls 220, 222 are parallel to each other, while the end wall 224 is perpendicular to the first and second lateral walls 220, 222.

With this in mind, the planar profile connector body 201, when viewed along a cross sectional plane perpendicular to the longitudinal axis of the planar profile connector body 201, is generally H-shaped. The planar connector body 201 includes a central wall 226, which ultimately defines the end walls 218, 224 of the first and second recesses 72, 74. The central wall 226 includes a top first edge 228 and a bottom second edge 230. Secured to, and extending perpendicularly from, the top first edge 228 in opposite directions are the first lateral walls 214, 220 of the first and second recesses 72, 74. The first lateral walls 214, 220 lie in the same plane and form a top surface 232 of the planar compression seal groove connector 70. Secured to, and extending perpendicularly from, the bottom second edge 230 are the second lateral walls 216, 222 of the first and second recesses 72, 74. The second lateral walls 216, 222 lie in the same plane and form a bottom surface 234 of the planar compression seal groove connector 70. It should be noted the free ends of the first lateral walls 214, 220 are tapered outwardly to increase the opening to the respective recesses 72, 74 and enhance insertion of a panel 120 therein.

The central wall 226 includes a central wall first interior surface 236 and an opposed central wall second interior surface 238 on the opposite side thereof. Similarly, the first lateral walls 214, 220 of the first and second recesses 72, 74 each include a first lateral wall exterior surface 240, 242 and a first lateral wall interior surface 244, 246, and the second laterals wall 216, 222 of the first and second recesses 72, 74 each include a second lateral wall exterior surface 248, 250 and a second lateral wall interior surface 252, 254.

The first lateral wall exterior surfaces 240, 242 of the first lateral walls 214, 220 define the top surface 232 of the planar connector body 201 and the second lateral wall exterior surfaces 248, 250 of the second lateral walls 216, 222 define the bottom surface 234 of the planar connector body 201. With regard to the first and second recesses 72, 74, they are defined by the respective interior surfaces of the central wall 226, first lateral walls 214, 220, and second lateral walls 216, 222. In particular, the central wall first interior surface 236, first lateral wall interior surface 244 of the first lateral wall 214 of the first recess 202, and the second lateral wall interior surface 252 of the second lateral wall 216 of the first recess 202 define the first recess 202. Similarly, the central wall second interior surface 238, first lateral wall interior surface 246 of the first lateral wall 220 of the second recess 204, and the second lateral wall interior surface 254 of the second lateral wall 222 of the second recess 204 define the first recess 202.

The distance between the first lateral wall interior surface 244 of the first lateral wall 214 of the first recess 202 and the second lateral wall interior surface 252 of the second lateral wall 216 of the first recess 202 is such that the edge of structural thermal barrier double-wall construction panels 120 may be positioned therein with a snug fit. As such, the distance between the first lateral wall interior surface 244 of the first lateral wall 214 of the first recess 202 and the second lateral wall interior surface 252 of the second lateral wall 216 of the first recess 202 is approximately the same as the thickness of a structural thermal barrier double-wall construction panel 120.

Similarly, the distance between the first lateral wall interior surface 246 of the first lateral wall 220 of the second recess 204 and the second lateral wall interior surface 254 of the second lateral wall 222 of the second recess 204 is such that the edge of structural thermal barrier double-wall construction panels 120 may be positioned therein with a snug fit. As such, the distance between the first lateral wall interior surface 246 of the first lateral wall 220 of the second recess 204 and the second lateral wall interior surface 254 of the second lateral wall 222 of the second recess 204 is approximately the same as the thickness of a structural thermal barrier double-wall construction panel 120.

Each of the first lateral wall interior surface 244 of the first lateral wall 214 of the first recess 202, the second lateral wall interior surface 252 of the second lateral wall 216 of the first recess 202, the first lateral wall interior surface 246 of the first lateral wall 220 of the second recess 204, and the second lateral wall interior surface 254 of the second lateral wall 222 of the second recess 204 includes a plurality of compression seal grooves 256. Each groove 256 preferably has a width of 5 mm and a depth of 1 mm. The compression seal grooves 256 are preferably spaced at 18 mm intervals along the lateral axis 210.

The compression seal grooves 256 extend along the length of the planar compression seal groove connector 70 and as such are parallel to the longitudinal axis of the planar compression seal groove connector 70. By providing the compression seal grooves 256 along the length of the planar compression seal groove connector 70, the seal between the structural thermal barrier double-wall construction panel 120 and the planar compression seal groove connector 70 is maintained stable and fully sealed at higher static pressures than without compression seal grooves 256. The compression seal grooves 256 act as a compression seal along a seam between the exterior surface of a structural thermal barrier double-wall construction panel 120 and the interior surfaces of the respective first and second recesses 202, 204.

In practice, sealants or adhesives are placed on the edge and outer surface of the structural thermal barrier double-wall construction panel 120. The structural thermal barrier double-wall construction panel 120 is then inserted into the respective first or second recesses 202, 204 of the planar compression seal groove connector 70 and the sealant spreads along the interior surfaces of the first or second recesses 202, 204 and fills the compression seal grooves 256. The grooves 256 allow a greater amount of sealant to be used on the outer surfaces of the inserted structural thermal barrier double-wall construction panel 120. The sealant is trapped in the compression seal grooves 256 on the interior surfaces and cures causing a greater compression seal to be formed with the structural thermal barrier double-wall construction panel 120.

In addition to allowing for the use of greater amounts of sealant in the joint between the structural thermal barrier double-wall construction panel 120 and the planar compression seal groove connector 70, and creating a desirable compression seal, the inclusion of the grooves 256 prevents all of the sealant from being squeezed out of the joint created as the structural thermal barrier double-wall construction panel 120 is inserted into the respective first or second recesses 202, 204 of the planar compression seal groove connector 70. In particular, the first and second recesses 202, 204 are shaped to fit tightly about the structural thermal barrier double-wall construction panel 120. When the structural thermal barrier double-wall construction panel 120 is inserted into either the first or second recesses 202, 204, there is a tendency for the sealant to be pushed out of the resulting joint. However, and with the inclusion of the grooves 256, there is space into which the sealant may flow without being forced from joint.

With the use of such a construction as the internal static pressure inside a completed H.V.A.C. housing unit increases so does the seal lowering the leakage rate at higher static pressures. The result is a lower operating cost for the end user and less contaminants introduced into the airstream inside the assembled unit. The H.V.A.C. housing unit requires at least one compression seal groove 256 be placed on the interior surface of the recess and the number of compression seal grooves 256 can be varied based upon size and use of the assembly.

As discussed above, in addition to the planar compression seal groove connector 70 described above, perpendicular compression seal groove connectors 2 are disclosed. The perpendicular compression seal groove connectors 2 include an elongated perpendicular connector body 101 having perpendicularly oriented recesses that are shaped and dimensioned for receipt of and engagement with edges of the structural thermal barrier double-wall construction panels 120 when it is necessary to couple structural thermal barrier double-wall construction panels 120 at the edges of an H.V.A.C. housing unit. The perpendicular connector body 101 includes a longitudinal axis 108 along which the length of the perpendicular connector body 101 is defined. It is appreciated the length of the perpendicular compression seal groove connector 2 may be varied depending upon the length of the panel edges that are being coupled. The perpendicular connector body 101 also includes a lateral axis 110 defining the width of the perpendicular connector body 101.

Considering the perpendicular connector body 101 when viewed along a cross sectional plane perpendicular to the longitudinal axis of the perpendicular compression seal groove connector body 101, the perpendicular connector body 101 includes a first recess 4 defined by first and second lateral walls 114, 116 and an end wall 118 extending between the first and second lateral walls 114, 116 at the base of the first recess 4. The second recess 104 is defined by first and second lateral walls 1200, 1202 and an end wall 124, wherein the end wall 124 of the second recess 3 is defined by a portion of the first lateral wall 114 of the first recess 4. As such, the first and second lateral walls 1200, 1202 of the second recess 3 are secured to and extend perpendicular to the first lateral wall 114. The first lateral wall 1200 of the second recess 3 lies in the same plane as the end wall 118 of the first recess 4 and the second lateral wall 1202 of the second recess 3 is centrally located along the lateral length of the first lateral wall 114 of the first recess 4 (and lies in a plane parallel to the plane in which the first lateral wall 1200 of the second recess 3 and the end wall 118 of the first recess 4 lie). As with the planar compression seal groove connector 70, free ends are tapered outwardly to improve insertion of a panel 120. In particular, the free ends of the first lateral wall 1200 of the second recess 3 and the second lateral wall 116 of the first recess 4 are tapered outwardly.

The end wall 118 of the first recess 4 includes an end wall interior surface 136 and an opposed end wall exterior surface 138 on the opposite side thereof. Similarly, the first lateral wall 114, 120 of the first and second recesses 3, 4 each include a first lateral wall exterior surface 140, 142 and a first lateral wall interior surface 144, 146, and the second laterals wall 116, 122 of the first and second recesses 3, 4 each include a second lateral wall exterior surface 148, 150 and a second lateral wall interior surface 152, 154. However, the interior surface 125 of the end wall 124 of the second recess 3 is defined by that portion of the first lateral wall exterior surface 140 of the first lateral wall 114 of the first recess 4 encompassed by the first and second lateral walls 1200, 1202 of the second recess 3.

With this in mind, and with regard to the first and second recesses 3, 4, they are defined by the respective interior surfaces of the lateral walls and the end walls. In particular, the end wall interior surface 136, first lateral wall interior surface 144 of the first lateral wall 114 of the first recess 4, and the second lateral wall interior surface 152 of the second lateral wall 116 of the first recess 4 define the first recess 4. Similarly, the first lateral wall exterior surface 140 of the first lateral wall 114 of the first recess 4, first lateral wall interior surface 146 of the first lateral wall 120 of the second recess 3, and the second lateral wall interior surface 154 of the second lateral wall 122 of the second recess 204 define the first recess 4.

The distance between the first lateral wall interior surface 144 of the first lateral wall 114 of the first recess 4 and the second lateral wall interior surface 152 of the second lateral wall 116 of the first recess 4 is such that the edge of structural thermal barrier double-wall construction panels 120 may be positioned therein with a snug fit. As such, the distance between the first lateral wall interior surface 144 of the first lateral wall 114 of the first recess 4 and the second lateral wall interior surface 152 of the second lateral wall 116 of the first recess 4 is approximately the same as the thickness of a structural thermal barrier double-wall construction panel 120.

Similarly, the distance between the first lateral wall interior surface 146 of the first lateral wall 120 of the second recess 104 and the second lateral wall interior surface 154 of the second lateral wall 122 of the second recess 104 is such that the edge of structural thermal barrier double-wall construction panels 120 may be positioned therein with a snug fit. As such, the distance between the first lateral walls interior surface 146 of the first lateral wall 120 of the second recess 104 and the second lateral wall interior surface 154 of the second lateral wall 122 of the second recess 104 is approximately the same as the thickness of a structural thermal barrier double-wall construction panel 120.

Each of the first lateral wall interior surface 144 of the first lateral wall 114 of the first recess 4, the second lateral wall interior surface 152 of the second lateral wall 116 of the first recess 4, the first lateral wall interior surface 146 of the first lateral wall 120 of the second recess 3, and the second lateral wall interior surface 154 of the second lateral wall 122 of the second recess 3 includes a plurality of compression seal grooves 156 that are shaped and dimensioned similarly to those disclosed above with reference to the planar compression seal groove connector 70.

The compression seal grooves 156 extend along the length of the perpendicular compression seal groove connector 2 and as such are parallel to the longitudinal axis of the perpendicular compression seal groove connector 2. As discussed above with regard to the planar compression seal groove connector 70, by providing the compression seal grooves 156 along the length of the perpendicular compression seal groove connector 2, the seal between the structural thermal barrier double-wall construction panel 120 and the perpendicular compression seal groove connector 2 is maintained stable and fully sealed at higher static pressures than without the compression seal groves 156. Bonding of panels within the recesses is the same as described above with reference to the planar compression seal groove connector and as such will not be repeated herein.

In addition to the planar and perpendicular compression seal groove connectors 2, 70 disclosed above, a single recess compression seal groove connector 350 is also provided. The single recess compression seal groove connector 350 includes an elongated single recess connector body 351 having a single recess 352 shaped and dimensioned for receipt of and engagement with edges of the structural thermal barrier double-wall construction panels 120. The single recess 352 is defined by first and second lateral walls 354, 355 and an end wall 353 extending between the first and second lateral walls 354, 355 at the base of the single recess 352. The first and second lateral walls 354, 355 are parallel to each other, while the end wall 353 is perpendicular to the first and second lateral walls 354, 355. With this in mind, the single recess connector body 351, when viewed along a cross sectional plane perpendicular to the longitudinal axis of the single recess connector body 351, is generally C-shaped. The end wall interior surface 353*i*, first lateral wall interior surface 354*i*, and the second lateral wall interior surface 355*i* define the single recess 352.

The distance between the first lateral wall interior surface 354*i* and the second lateral wall interior surface 355*i* is such that the edge of a structural thermal barrier double-wall construction panel 120 may be positioned therein with a snug fit. As such, the distance between the first lateral wall interior surface 354*i* and the second lateral wall interior surface 355*i* is approximately the same as the thickness of a structural thermal barrier double-wall construction panel 120. As with the perpendicular and planar compression seal groove connectors 2, 70, the free end 360 of the first lateral wall 354 is tapered outwardly 362 to improve insertion of a panel 120.

Each of the first lateral wall interior surface 354*i* and the second lateral wall interior surface 355 includes a plurality of compression seal grooves 356 similar to those discussed above with regard to the compression seal groove connectors embodiments shown in FIGS. 1 and 3. The compression seal grooves 356 extend along the length of the planar compression seal groove connector 350 and as such are parallel to the longitudinal axis of the planar compression seal groove connector 350.

The provision of the compression seal groove connectors 2, 70, 350 in accordance with the present invention, provides for a compression seal to increase the seal between structural thermal barrier double-wall construction panels 120 and a compression seal groove connector 2, 70, 350 at higher static pressures or similar applications. The present invention therefore provides for the manufacture of compression seal groove connectors for structural thermal barrier double-wall construction panels 120 in an easy and cost effective manner. The present invention also allows for the preparation of a stable, durable plenum from the interconnected structural thermal barrier double-wall construction panels 120 using the compression seal groove connectors with compression seal grooves, so that the resulting plenum unit has a lower leakage rate at higher static pressures.

In accordance with a preferred embodiment, both the top wall 260 and the bottom wall 240 are composed of two structural thermal barrier double-wall construction panels 120 held together using planar compression seal groove connectors 70. The first and second lateral side walls 200, 220 are similarly composed of the two structural thermal barrier double-wall construction panels 120 held together using planar compression seal groove connectors 70. Each of the structural thermal barrier double-wall construction panels 120 of the first lateral side wall 200 is provided with apertures that ultimately define the first and second side wall outlet apertures 180 discussed above. Each of the front wall 280 and the rear wall 300 is composed of single structural thermal barrier double-wall construction panels 120, and, as discussed above, respectively include an inlet aperture 140 and an access aperture 160. The first and second lateral side walls 200, 220, the bottom wall 240, the top wall 260, the front wall 280 and the rear wall 300 are then assembled into the desired rectangular or square construction with perpendicular compression seal groove connectors 2 securing the various edges thereof in a desired manner.

As briefly explained above, each of the first and second lateral side walls 200, 220, the bottom wall 240, the top wall 260, the front wall 280 and the rear wall 300, as well as the access doors 170 are constructed from non-corrosive double-wall construction structural thermal barrier double-wall construction panels 120 as described below with reference to FIGS. 4-8. It is appreciated than an H.V.A.C. housing 100 in accordance with the present invention can be made up of one or many separate panels, or pieces, which can serve many purposes including acoustic separation, physical separation, protection, visual barrier, equipment encapsulation, air movement, or pressurization. The construction of the thermal barrier double-wall construction panels 120 disclosed in this invention can be used, among other uses, to construct roof panels, wall panels, floor panels, door panels, or other partition panels.

Figure 4:
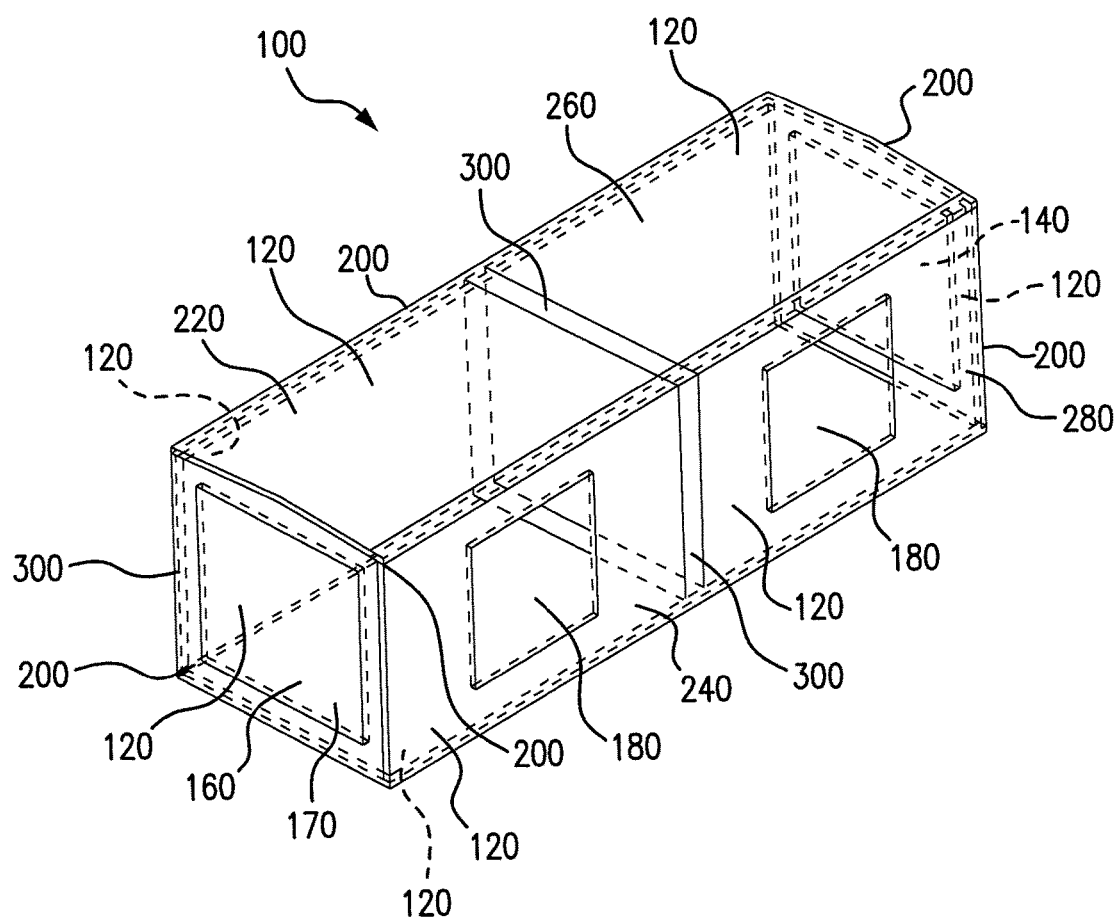
FIG. 4 is a perspective view of an H.V.A.C. housing in accordance with a preferred embodiment of the present invention.
Figure 7:
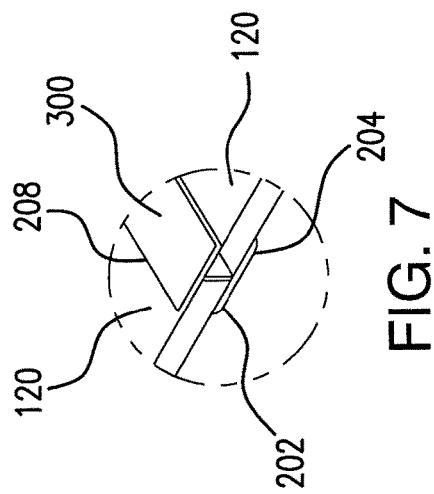
FIG. 7 is a detailed view of the edge section designated at 7-7 in FIG. 6.
Figure 8:
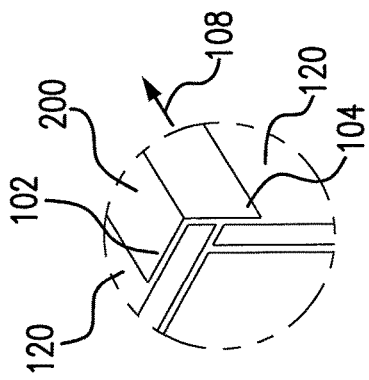
FIG. 8 is a detailed sectional view along the section 8-8 in FIG. 6.
Figure 5:
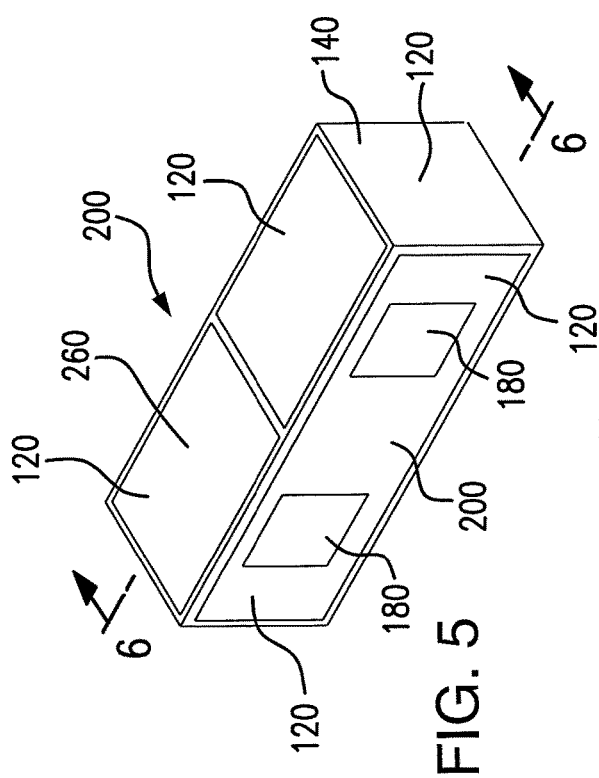
FIG. 5 is a second perspective view of an H.V.A.C. housing in accordance with the present invention.
Figure 6:
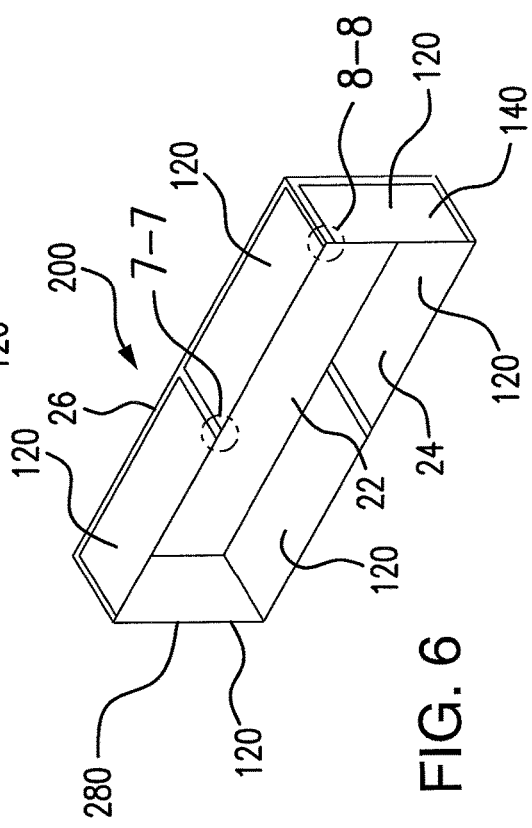
FIG. 6 is a cross sectional view of the housing shown in FIG. 5 along the line 6-6.

In accordance with a preferred embodiment, and with reference to FIG. 4, each of the thermal barrier double-wall construction panels 120 that make up H.V.A.C. housing has a foam core 400. The foam core 400 is preferably made of a polyurethane foam insulation or polyvinyl chloride foam, to which an interior and exterior engineered structural covering 420, 440, for example NIDA-CORE®, is secured. In particular, the foam core 400 includes a first inner surface side 460 and an opposed second outer surface side 480. The interior engineered structural covering 420 is secured to the first inner surface side 46 of the foam core 400 and the exterior engineered structural covering 440 is secured to the second outer surface side 480 of the foam core 400.

Figure 10:
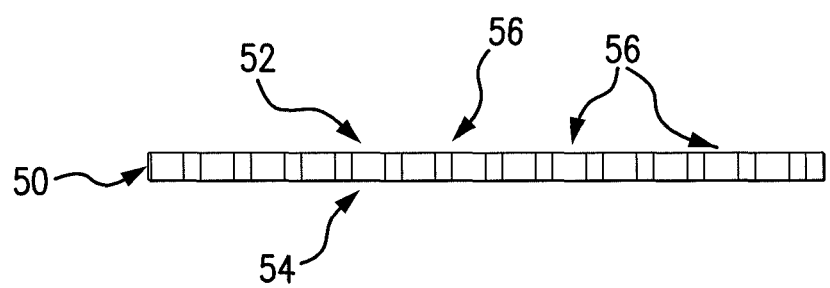
FIG. 10 is a side schematic of an engineered structural covering in accordance with the present invention.
Figure 11:
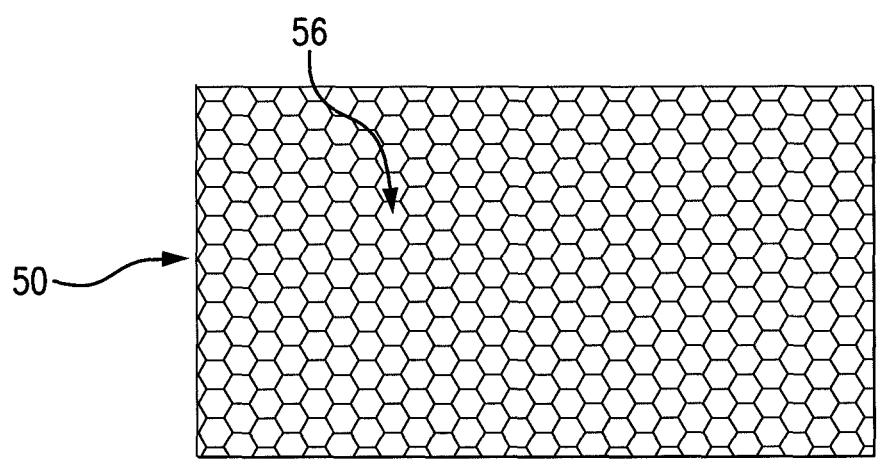
FIG. 11 is a top plan view of a central core of the engineered structural covering shown in FIG. 10.
Figure 12:
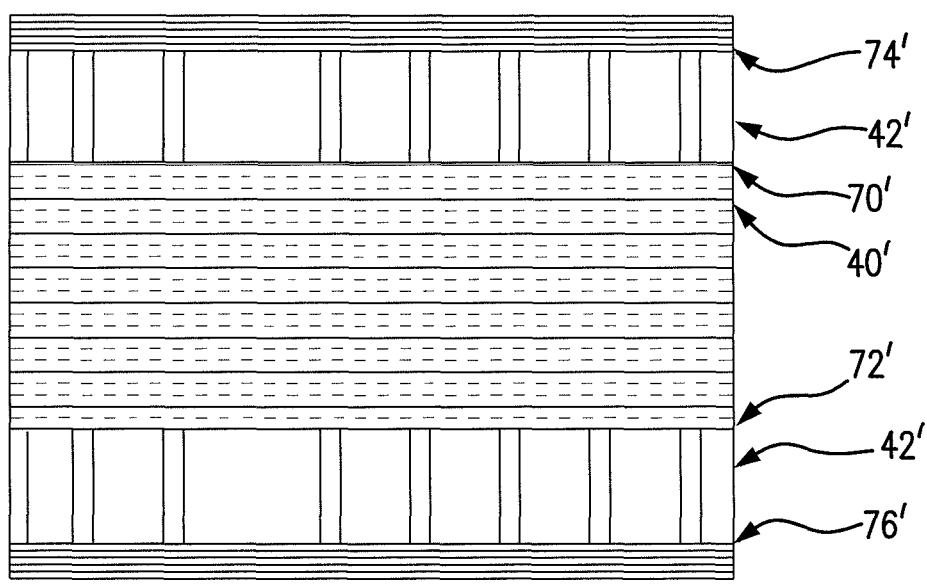
FIG. 12 is a schematic of an alternate thermal barrier double wall construction panel in accordance with the present invention.

The interior and exterior engineered structural coverings 420, 440 (also referred to as layers or barriers), are preferably constructed in a similar manner. Referring to FIGS. 10-12, the interior engineered structural covering 420 includes a central core 50, for example a polypropylene honeycomb sheet stock such as NIDA-CORE® or may be constructed of an aluminum honeycomb sheet stock material, having an inside first surface side 52 and an opposed second surface side 54 with air gaps 56 contained therein and defined by the honeycomb structure of the central core 50. A top view of the polypropylene honeycomb sheet stock can be seen in FIG. 11. A liner 580 (also known as a skin) is secured on one side, for example, the first surface side 52, of the engineered structural covering 420, and the first inside surface side 46 of the foam core 400 is secured on the other side, that is the opposed second surface side 54 of the central core 50. The interior engineered structural coverings 420 are bonded in place using adhesives, resins, glues, or other mechanical means.

As to the exterior engineered structural covering 440, it is preferably identical to the interior engineered structural covering 420. As such, and with reference to FIGS. 9-12 showing the indicated interior engineered structural covering 420, the exterior engineered structural covering 440 includes a central core 50, for example fabricated from a polypropylene honeycomb sheet stock such as NIDA-CORE® or may be constructed of an aluminum honeycomb sheet stock material, having a first surface side 52 and an opposed second surface side 54. A liner 660 (also known as a skin) is secured on one side, for example, the first surface side 52, of the exterior engineered structural covering 440, and the second outer surface side 480 of the foam core 400 is secured on the other side, that is the opposed second surface side 64 of the central core 60.

In a preferred embodiment as shown in FIG. 9, the liners 580, 660, are composed of fiberglass reinforced plastic laminations saturated with resin. In a preferred embodiment, these laminations may be composed of, but not limited to, a surface gel coat, single or multiple layers of surface mat and woven roving.

It is appreciated that the thermal barrier double-wall construction panels 120 described in this invention may be cut into multiple panels of desired sizes, which may then be used in the construction of an H.V.A.C. unit. In addition, it is appreciated the construction panels can be reinforced on one or both sides by a layer or layers of fiberglass, polyester, surface mat, woven roving, and/or gel coat.

Excellent strength and rigidity are provided, as well as a corrosion resistant structure, by the structural thermal barrier double-wall construction panels 120 shown in FIG. 9 composed of a foam core 400, engineered structural coverings 420, 440, and liners 580, 660. In a preferred embodiment, the thermal barrier double-wall construction panels 120 as depicted in FIG. 10 use a honeycomb sheet stock as depicted in FIGS. 9-12 composed of a co-polymer compound of polypropylene resulting in a structure with excellent specific rigidity (stiffness to weight) and energy absorption, while incorporating the material benefits of visco-elasticity.

It is appreciated the most common method of fabrication for the honeycomb central sheet stock is adhesive bonding flat sheets of material with offset lines of adhesive, and subsequently expanding them to open the cells. This technique is commonly used to fabricate honeycomb from paper or aluminum products. By contrast, honeycombs may also be constructed from thermoplastic materials by extruding profiles through a die and then joining them by thermal fusion to form large blocks, which eliminates the need for adhesives. Regardless of the method used, honeycomb sheet stock can be cut from the large blocks of honeycomb in the same fashion as foam or end-grain balsa. However, the sheet stock cut from the extruded profiles will possess mechanical properties in the longitudinal and transverse directions of the core that differ from the properties of adhesively bonded and expanded honeycombs.

In order to obtain maximum strength and eliminate delamination, this invention includes in an alternate embodiment, the addition of chemical bonding layers 70', 72', such as a resin-absorbing material such as fiberglass cloth, mat, woven roving or other porous or semi-porous or absorbent material designed to absorb resin and hold it in place over the entire plane where the interior and exterior engineered structural coverings 420', 440', meet the foam core 400'. (See FIG. 11) A plurality of skin layers 74', 76' are provided on the exterior surfaces of the interior and exterior engineered structural coverings 420', 440'. The skin layers 74', 76' serve to increase the bond strength between the foam core 400' and the interior and exterior engineered structural coverings 420', 440', and thus reduce the chance of delamination when the panels are exposed to differential pressure.

The invention claimed is:

1. A plenum housing, comprising:
a plurality of structural thermal barrier double-wall construction panels including a first lateral side wall, a second lateral side wall, a bottom wall, a top wall, a front wall, and a rear wall defining the plenum housing;
a plurality of compression seal groove connectors secured between the plurality of structural thermal barrier double-wall construction panels, each of the plurality of compression seal groove connectors includes a recess having two interior opposing surfaces with at least one compression seal groove, each of the at least one compression seal grooves extends along a length of a respective compression seal groove connector and is parallel to a longitudinal axis of the respective compression seal groove connector, wherein a seal is formed between each of the plurality of structural thermal barrier double-wall construction panels and each of the two interior opposing surfaces of the respective compression seal groove connector, the seal including adhesive between the each of the plurality of structural thermal barrier double-wall construction panels and each of the two interior opposing surfaces of the respective compression seal groove connector such that the adhesive fills the at least one compression seal groove, the recess being shaped and dimensioned for encapsulating and engaging a lateral edge of each of the plurality of structural thermal barrier double-wall construction panels with the adhesive between the two interior opposing surfaces and the lateral edge of the structural thermal barrier double-wall construction panel, the plurality of compression seal groove connectors being shaped and dimensioned to hold the lateral edge of each of the plurality of structural thermal barrier double-wall construction panels in spaced relationships and at various angular orientations, wherein the plenum housing has a SMACNA duct leakage class between 0 and 3.

2. The plenum housing according to claim 1, wherein the at least one compression seal groove includes a plurality of compression seal grooves.

3. The plenum housing according to claim 2, wherein each of the plurality of compression seal grooves has a width of 5 mm and a depth of 1 mm.

4. The plenum housing according to claim 3, wherein each of the plurality of compression seal grooves are spaced at 18 mm intervals.

5. The plenum housing according to claim 1, wherein each of the plurality of structural thermal barrier double-wall construction panels has a foam core and interior and exterior engineered structural coverings.

6. The plenum housing according to claim 1, wherein each of the plurality of compression seal groove connectors is of an extruded polymer construction.

7. The plenum housing according to claim 1, wherein the plurality of compression seal groove connectors includes a perpendicular compression seal groove connector for securely holding adjacent construction panels in a perpendicular orientation.

8. The plenum housing according to claim 1, wherein the plurality of compression seal groove connectors includes a planar compression seal groove connector for securely holding adjacent construction panels in a planar orientation.

* * * * *